United States Patent
Karlsson et al.

(10) Patent No.: US 7,408,509 B2
(45) Date of Patent: *Aug. 5, 2008

(54) DIRECTION FINDING METHOD AND SYSTEM USING PROBABILISTIC MAPPING

(75) Inventors: Lars Karlsson, Santa Clara, CA (US); Dmitri Soloviev, Santa Clara, CA (US)

(73) Assignee: Agilent Technologies, Inc, Santa Clara, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 10/785,356

(22) Filed: Feb. 24, 2004

(65) Prior Publication Data

US 2004/0164902 A1     Aug. 26, 2004

Related U.S. Application Data

(60) Provisional application No. 60/449,443, filed on Feb. 24, 2003.

(51) Int. Cl.
    *G01S 5/04* (2006.01)
(52) U.S. Cl. ............... 342/449; 342/450; 342/451; 342/457
(58) Field of Classification Search .......... 342/449, 342/450–452, 457, 465
See application file for complete search history.

(56) References Cited

U.S. PATENT DOCUMENTS

| | | | | |
|---|---|---|---|---|
| 3,015,098 A | * | 12/1961 | Jolliffe et al. | 342/465 |
| 3,132,341 A | * | 5/1964 | Fryklund | 342/452 |
| 5,045,860 A | * | 9/1991 | Hodson | 342/451 |
| 6,249,252 B1 | * | 6/2001 | Dupray | 342/450 |
| 2003/0112183 A1 | * | 6/2003 | Szajnowski | 342/465 |
| 2004/0029558 A1 | * | 2/2004 | Liu | 455/404.2 |

* cited by examiner

*Primary Examiner*—Thomas H. Tarcza
*Assistant Examiner*—Fred H. Mull
(74) *Attorney, Agent, or Firm*—Steins & Associates, P.C.

(57) ABSTRACT

A Direction Finding Method and System Using Probabilistic Mapping is disclosed. Also disclosed is a preferred system that employs a technique for taking in data sets (lines of bearing) from DF receivers and characterizing those signals with their respective probabilities of error. Then using a unique method, the preferred system can display the triangulated position on a map with an overlay of probability fields indicating the emitter location with varying levels of confidence. Even further, the preferred system is able to redraw the probability fields on the map display in real-time as new data is collected and updated. In this way, a far more efficient EL System has been achieved in which the emitter's position can be determined more quickly. It should be noted that with this invention, triangulation can be done with just a single (mobile) DF Set in the EL System. Today's systems for triangulation must use at least three DF Sets.

5 Claims, 5 Drawing Sheets

DIRECTION FINDING METHOD AND SYSTEM USING PROBABILISTIC MAPPING

This application is filed within one year of, and claims priority to Provisional Application Ser. No. 60/449,443, filed Feb. 24, 2003.

BACKGROUND OF THE INVENTION

1. Field of the Invention

This invention relates generally to Emitter Locator Systems and, more specifically, to a Direction Finding Method and System Using Probabilistic Mapping.

2. Description of Related Art

Emitter Location (EL) Systems are used to locate the position of emitting radio transmitters. Typically, once an EL System determines where (to the best of its ability) a transmitter is, this location is then plotted on a relevant map display for the operator. Other systems or modes sometimes only display the relative bearing from the receiver to the transmitter, where a radio Direction Finding (DF) System is employed. Unfortunately, real-world EL System measurements inherently have uncertainties due to several factors. Thus, the position of a transmitter on a display is only accurate to within a certain measurement error.

Some of today's EL systems display the error as a fixed offset shown on the screen using two lines to draw a "wedge" of a reading, say from 275 to 285 degrees. Other systems display the expected error on a separate indicator (as a number, or as a bar graph of varying height or length), and then the operator is expected to apply this expected error to the reading. Yet another group of EL systems does not display the error at all. This leaves the EL System operator with an inherently imprecise location of the transmitter, and thus a decreased confidence and reliability in the position "fix."

The invention of this disclosure is a computer-executed display system and method that provides a far more useful, practical, and probabilistic method of presenting measurement data to EL System operators than is presently done today. This is done by a unique display method and system that takes measurements, produces and displays "probability fields" related to where a transmitter is most likely to be located. The fields change interactively in real-time and are constantly updated as new measurements arrive. In addition, the method of this display system performs statistical calculations to further enhance the accuracy of the probability presentations.

To understand how this invention provides a unique probabilistic display of an emitter's location, it is first important to understand the technique by which EL Systems are employed.

An EL System may be comprised of one or more radio Direction Finding (DF) "Sets" which can either be fixed in location, or mobile on a vehicle, ship, aircraft, etc. The invention of this disclosure relates to EL Systems employing at least one mobile DF Set.

The invention uses an improved technique to collect data from one or multiple DF Sets, and then to intelligently present that data so that overall measurement uncertainties are included as part of the display. Since this unique display presents an intelligent probabilistic location of the transmitter, the odds that an EL System operator will actually locate that transmitter are greatly increased.

In conclusion, insofar as the inventor is aware, no invention formerly developed provides this unique method of probabilistically displaying transmitter locations in emitter location systems.

SUMMARY OF THE INVENTION

In light of the aforementioned problems associated with the prior methods and systems, it is an object of the present invention to provide a Direction Finding Method and System Using Probabilistic Mapping. The preferred system should provide a technique for taking in data sets (lines of bearing) from DF receivers and characterizing those signals with their respective probabilities of error. Then using a unique method, the preferred system can display the triangulated position on a map with an overlay of probability fields indicating the emitter location with varying levels of confidence. Even further, the preferred system must be able to redraw the probability fields on the map display in real-time as new data is collected and updated. In this way, a far more efficient EL System can be achieved in which the emitter's position can be determined more quickly. It should be noted that with this invention, triangulation can be done with just a single (mobile) DF Set in the EL System. Today's systems for triangulation must use at least three DF Sets.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Direction Finding Method and System Using Probabilistic Mapping.

Figure 1:
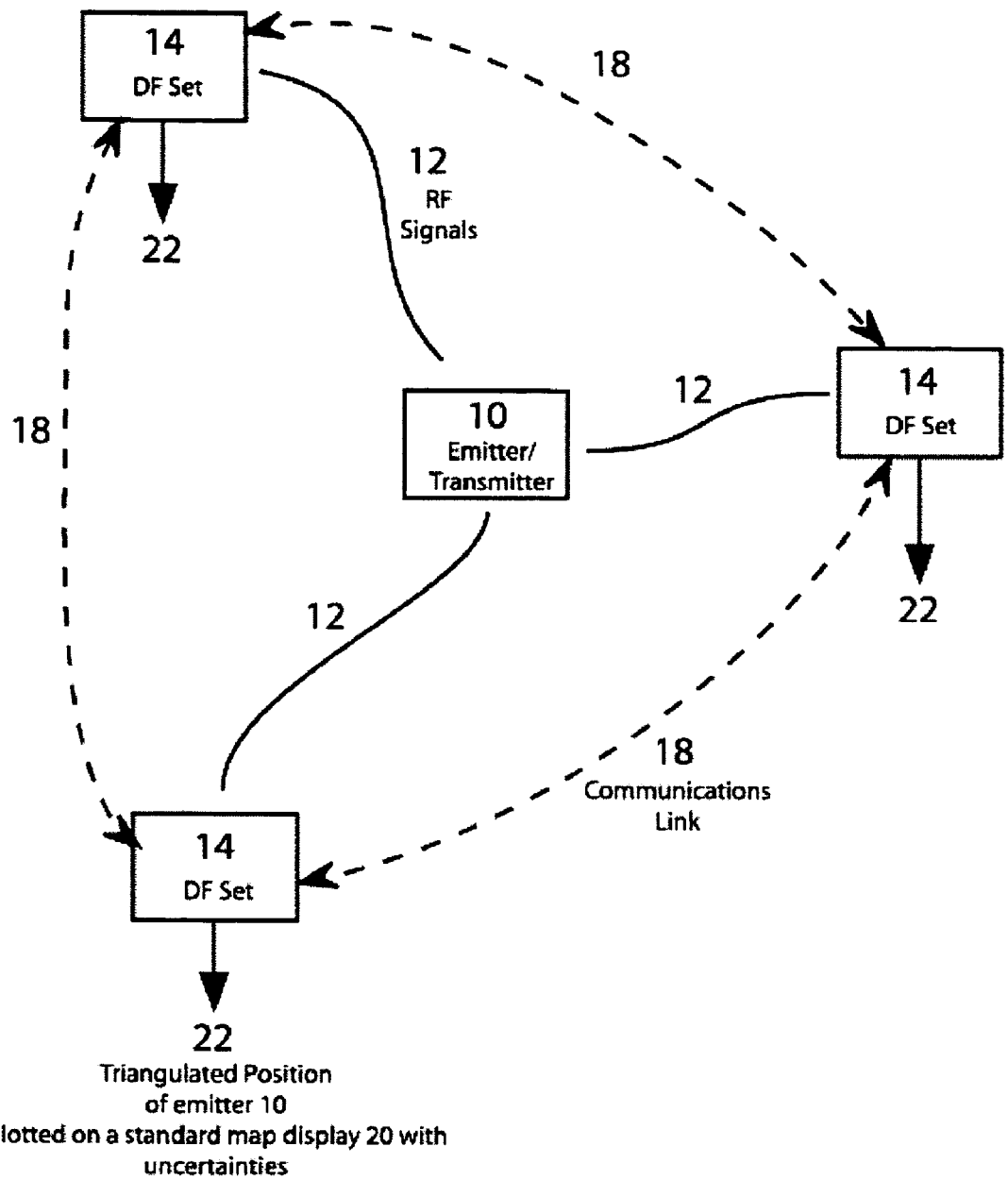
FIG. 1 is a drawing of a conventional triangulation-based EL System.

The present invention can best be understood by initial consideration of FIG. 1. FIG. 1 is a drawing of a conventional triangulation-based EL System 11. The system 11 is comprised of several DF Sets 14 which can communicate their line-of-bearing (LOB) measurements to each other. The LOB data from each DF Set is used to triangulate the position of the emitter which is then plotted on a map display for the EL System operator (see FIG. 2 for an example of this plot). This present day method of displaying the emitter location always has uncertainties due to the uncertainties of the LOB measurements themselves.

DF Sets 14 receive RF signals 12 from emitter 10. The DF Sets each independently make LOB measurements 16 and report them to each other over a communications link 18.

Each DF Set then has the ability to take the respective LOB measurements and computer the triangulated position 22 of emitter 10. This position is plotted on a standard map display 20.

As mentioned, an emitter location (EL) system is comprised of one or more direction finding (DF) Sets. Each DF Set is comprised of a receiver, a computer, and other devices to evaluate the direction to an emitter, relative to the DF Set's location. These line-of-bearing (LOB) measurements inherently have some level of uncertainty due to several reasons.

The major sources of measurement errors in real-world DF measurements are: (1) uncertainties from the DF antenna array due to frequency dependent variations; and (2) signal reflections, also known as multi-path.

Typically in a DF Set, the device that collects, interprets, and plots the line-of-bearing (LOB) data onto a map is a standard computer device. The LOBs that are displayed will vary from measurement to measurement depending on the aforementioned uncertainties. Most often in the industry today though, the DF Sets simply take the collected LOB data sets and average them to produce a best guess as to the true LOB to the transmitter. But as mentioned, the resulting LOB invariably has some level of error.

It should be reiterated and understood that present-day EL Systems contain inherent errors in their measurements, and subsequently display those measurements uncorrected. What is needed therefore in order to enhance the effectiveness, and usefulness of EL Systems is (1) An enhanced technique to collect the LOB data; and (2) The enhanced method of displaying the processed data to operators. These two things are performed by the invention of this provisional patent application.

Figure 2:
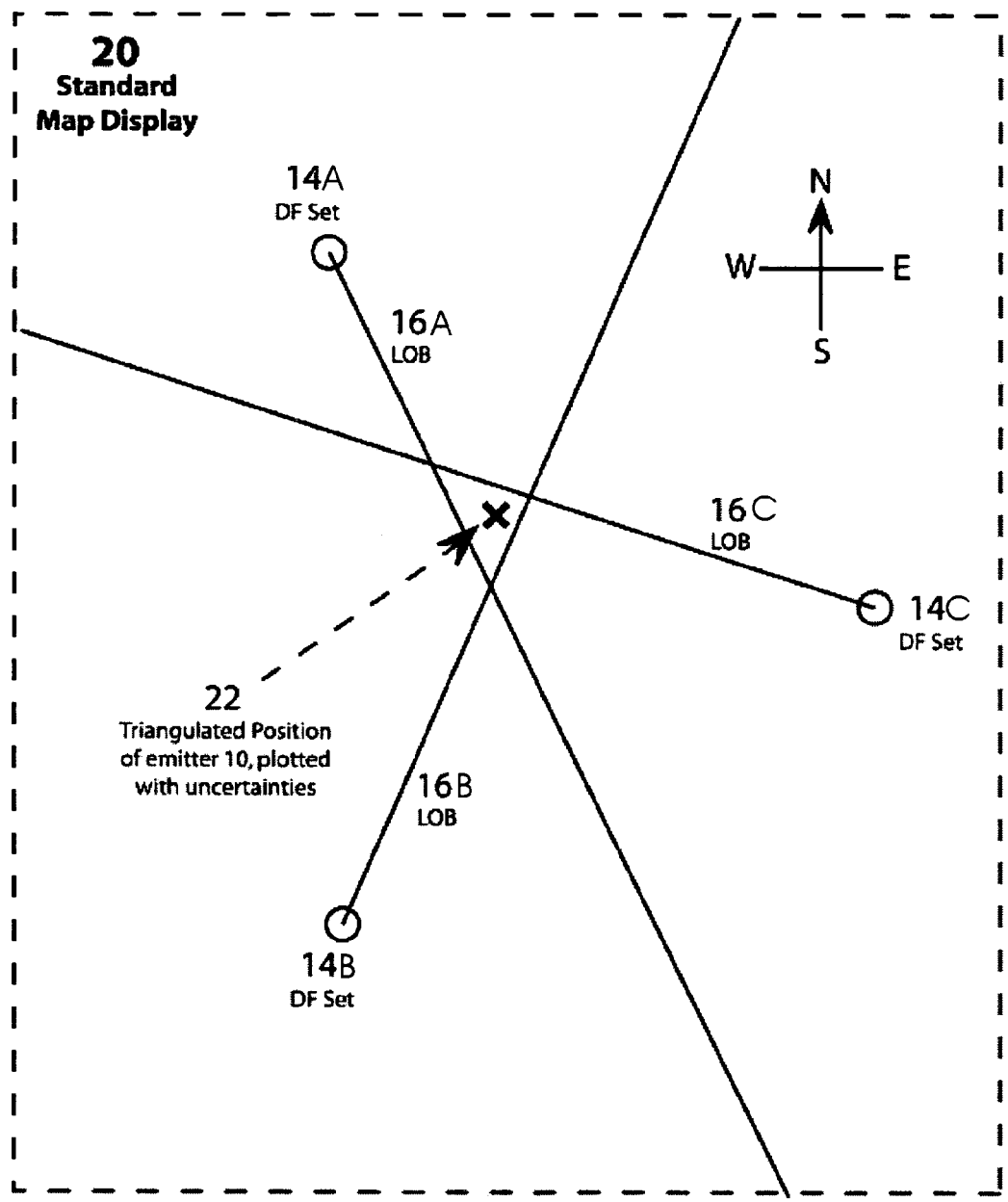
FIG. 2 is an example of what a present day mapping display looks like when using the setup of the system of FIG. 1.

FIG. 2 is an example of what a present day mapping display 20 looks like when using the setup of the system of FIG. 1. In this display 20, the positions of the three or more DF Sets 14A, 14B and 14C, for example, are plotted. The LOB 16 from each DF Set 14 may or may not be plotted. But the triangulated position 22 of the emitter is averaged from the various LOB data and plotted. Again, this position 22 is an averaged position based upon the LOB data, which inherently has a level of error.

Figure 3:
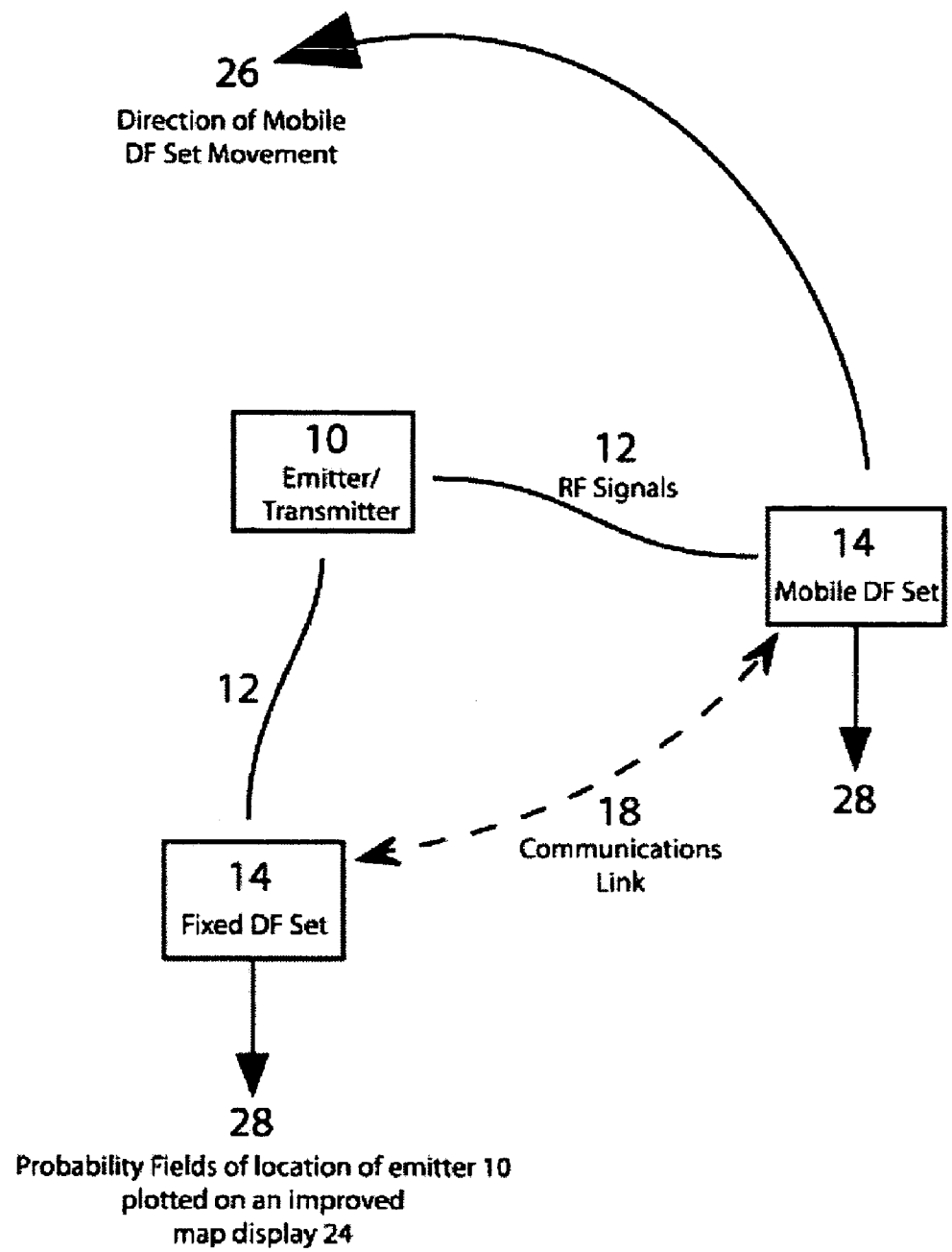
FIG. 3 is a drawing of a preferred embodiment of the present invention and how it is used.

FIG. 3 is a drawing of a preferred embodiment of the present invention and how it is used. In this case, at least one of the DF Sets 14D is mobile. The mobile units are also networked to the other DF Sets (e.g. 14B) and can relay back their LOB data back for triangulation purposes. This time though, the transmitter's position is displayed using the software of this invention. Probability fields are drawn in real-time with the technique described herein. Statistical processing is also performed on the data sets to hone the probability fields. The result is available to the operators at each DF Set location (see FIG. 4 for an example of this plot).

The communications link 18 allows each DF Set 14 to report its line of bearing and quality number data to each other. The quality number is a value provided by the DF receivers themselves that indicates the relative accuracy of any particular LOB measurement. This quality number is used by the method of this invention as shall be seen later.

At least one of the DF sets has to be mobile. Each DF Set has software capable of processing the collective LOB and quality number data with special filtering. The emitter's position with probability fields 28 is then plotted on the improved map display 24 in real time. This position will have greatly reduced uncertainties as opposed to the triangulated position 22 of FIG. 2. The technique of this invention provides a much faster triangulation process as well. It should be further noted that with the method of this invention, you do not need to have multiple DF Sets to triangulate a position, you can use a single mobile DF Set to achieve the same results.

Figure 4:
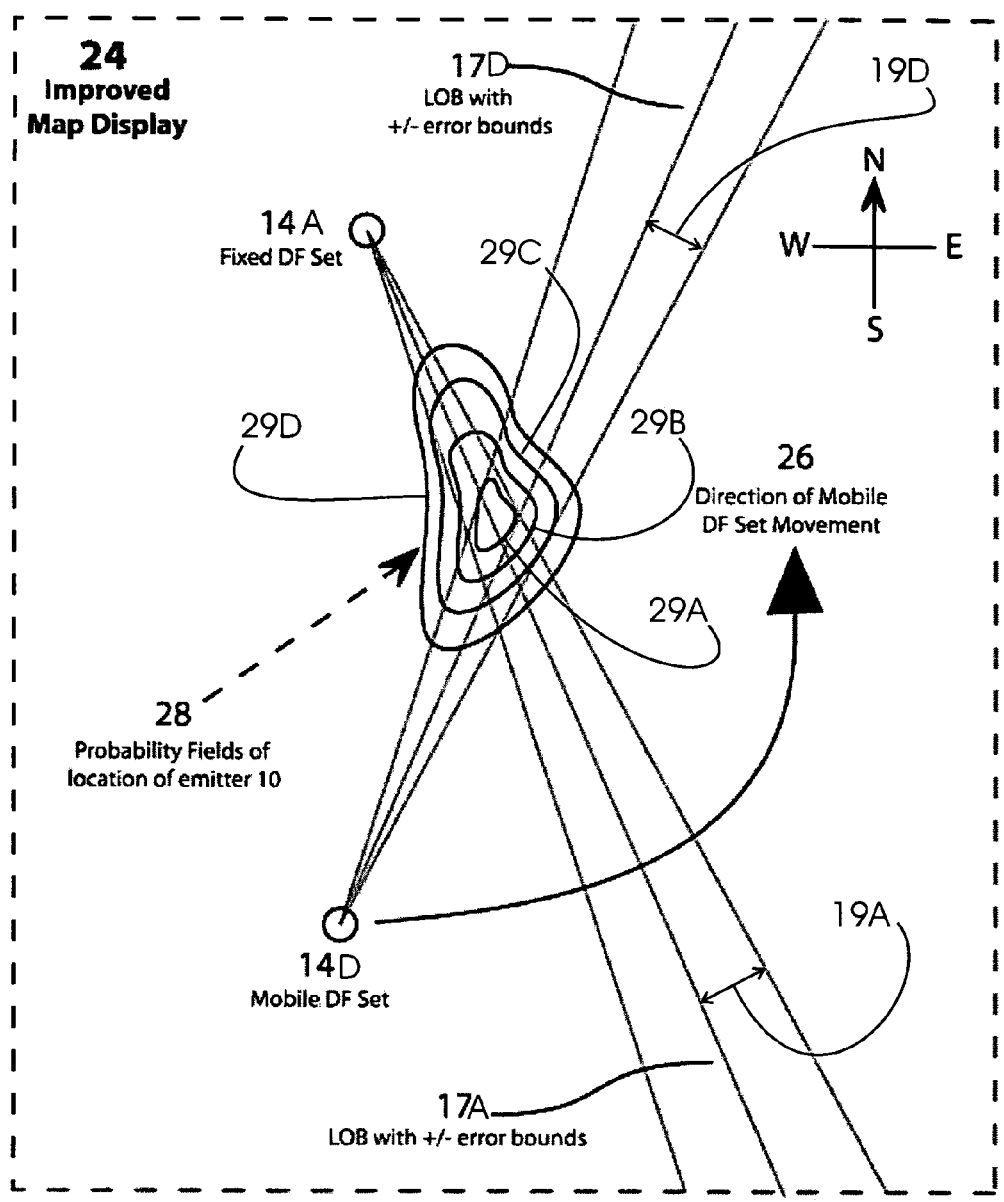
FIG. 4 is an example of how the probability field mapping display of the present invention can be presented to an EL System operator.

FIG. 4 is an example of how the probability field mapping display 24 of the present invention can be presented to an EL System operator.

In this display, the positions of the DF Sets 14A and 14D are also plotted. The LOB's 17A and 17B with error bounds 19A and 19D (calculated with the quality number) from each DF Set may or may not be plotted. But the probability field overlay map 28 of where the emitter is most likely located is indeed plotted. The various fields can have different colors representing a probability, or a sigma value that the emitter is located within that field. Higher probability fields are located in the center, with decreasing "rings" of probability going outward.

The technique of this invention involves the use of a mobile DF Set in an EL System. The first step is for a mobile DF Set to take an LOB measurement of emitter 10. This process involves taking the LOB data and the so-called "quality number" reading from the DF receiver. Modem DF receivers now produce a quality number with every LOB output. This quality number value is a metric by which the DF receiver manufacturer estimates the probability that a measurement is accurate. The computer in the DF Set then takes this quality number along with the actual LOB measurement and stores them in memory for future processing.

The next step is for the mobile DF Set to move its physical position with respect to the transmitter's position. While moving, the DF Set is constantly taking in more LOB data and associated quality numbers. This process goes on for as long as required to find the transmitter. The more data that is collected, the higher will be the probability that the triangulated position of the transmitter is where it is expected to be.

Figure 5:
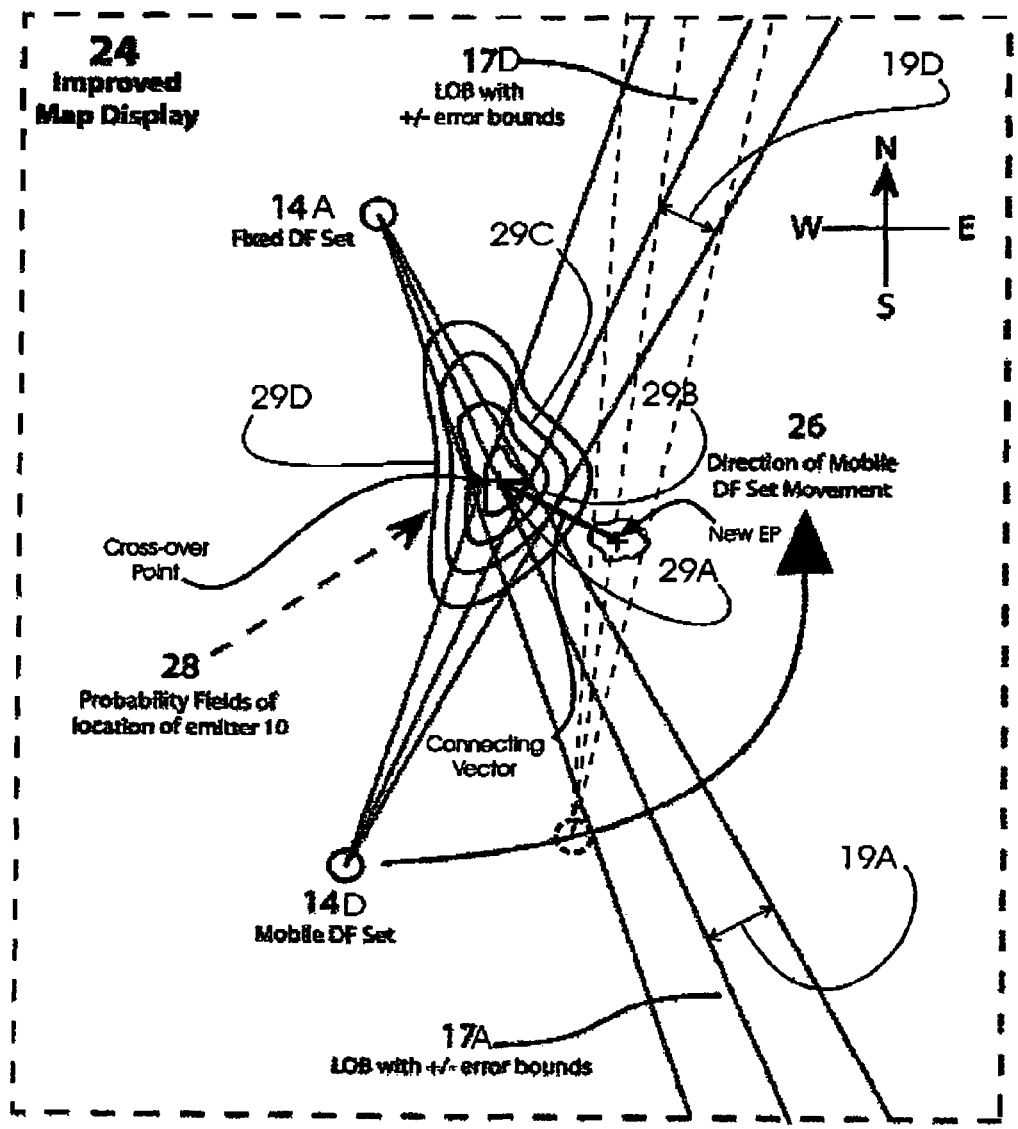
FIG. 5 depicts the method for using the mobile DF set and probability fields to determine progressive estimated positions (EPs).

This invention employs a specialized recursive method in the computer to process the LOB data that is continually being stored. This specialized method is the topic of another patent application entitled: "Technique and Algorithm for Reducing Measurement Uncertainties in Emitter Location Systems," Provisional Application Ser. No. 60/449,442, now "Real-time Emitter Locating System and Method," U.S. patent application Ser. No. 10/785,353, incorporated herein by reference. The whole process begins alter a "cross-over" point is first found. A cross-over point is the intersection between the last best LOB data entries from a pair of DF sets. This cross-over point, when fixed on a map, is the original triangulated position (hereafter referred to as the "cross-over position point") of the transmitter. In order to ascertain the changing position of a moving transmitter, the approach depicted in FIG. 5 is employed. Once cross-over position is found, successive estimated position points (of the transmitter) are determined by moving the mobile DF set in direction 26, generating a connecting vector between the real-time LOB from the mobile DF set to the transmitter, and thereby assigning the EP as being along the connecting vector. These position points (EPs) are then continually fed into a separate system/process that draws the "probability fields".

The main feature of this invention is the unique way of displaying these probability fields where the emitter is expected to be. The latest position point of the emitter is plotted on top of an area map that the computer also provides. The emitter position on the map is displayed initially as a cone or wedge from the operator's known position towards the transmitter. The cone's angle of dispersion is dependent upon the measurement uncertainty. This visual of the measurement uncertainty is created by the computer which assigns a probability curve over each LOB based on the quality number. The curves can be Gaussian in nature or taken from the antenna calibration tables. The exact probability distribution can be manually chosen by the DF Set operator as well. On the improved map display drawing of FIG. 4, this distribution across the cone is not shown, but the bounds of the error are shown for the LOB 17 measurements.

The resulting display to the DF Set operator is an overlayed area which has colors to indicate higher probability fields where the emitter might be. The color fields can be indicative of one, two, three, or more sigma probability that an emitter lies within that region. Furthermore, the computer can statistically multiply the respective probability curves of each LOB measurement 17 with each other to create an even more accurate overlay. Thus, the emitter 10 can be located within the overlay area within a certain probability of error.

The next step in the unique technique of this invention is for the operator to move closer to the center of the area overlay on the map. This will have the affect of making the area overlay smaller and smaller since the LOBs that are constantly taken, will result in position points that are closer and closer together. Thus, the accuracy of the probability fields will increase, and the overlay area of the field on the map display will appear to shrink. As mentioned, the computer displays regions of varying colors indicating the relative probabilities that the emitter is within that area overlay. The colors are configurable to the operator for ease of use.

DIAGRAM REFERENCE NUMERALS

10 Emitter/Transmitter
12 RF signals
14 DF Set
16 Line-of-bearing (LOB) measurement data
17 LOB data with error bounds calculated with the quality numbers
18 Communications Link
20 Standard Map Display
22 Triangulated Position calculated from LOB measurement data
24 Improved Map Display
26 Direction of mobile DF Set movement
28 Probability Fields of location of emitter Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A direction-finding method comprising the steps of:
   establishing a cross-over position point, said cross-over point defined as the intersection between LOBs generated by at least two receiving incident electronic signal;
   relocating one said receiver to a new receiver spacial location;
   said receiver at said new receiver position receiving a transmission from a transmitter at a transmitter position;
   determining a real-time line of bearing from said receiver at said new receiver position to said transmitter;
   generating a connecting vector from said real-time line of bearing to said cross-over position point; and
   identifying a real-time position of said transmitter along said connecting vector;
   displaying said real-time position on a user display panel; and
   generating and displaying probability overlay map responsive to said real-time position and said quality factor on said user display panel.

2. The method of claim 1, wherein said identifying step further comprises assigning a probability factor to said real-time position of said transmitter responsive to said quality factor and said probability overlay map generating and displaying is responsive to said probability factor.

3. The method of claim 2, further comprising a repeating step to repeat said relocating, receiving, determining, generating, identifying, displaying and generating steps until said probability factor exceeds a predetermined threshold value.

4. The method of claim 2, further comprising a repeating step to repeat said relocating, receiving, determining, generating, identifying, displaying and generating steps until said probability factor meets a user-defined threshold value.

5. The method of claim 2, further comprising a repeating step to repeat said relocating, receiving, determining, generating, identifying, displaying and generating steps until a user terminates said direction finding method.

* * * * *

UNITED STATES PATENT AND TRADEMARK OFFICE
CERTIFICATE OF CORRECTION

PATENT NO. : 7,408,509 B2  
APPLICATION NO. : 10/785356  
DATED : August 5, 2008  
INVENTOR(S) : Karlsson et al.

Page 1 of 1

It is certified that error appears in the above-identified patent and that said Letters Patent is hereby corrected as shown below:

In column 6, line 10, in Claim 1, after "two" insert -- receiver --.

In column 6, line 23, in Claim 1, after "displaying" insert -- a --.

In column 6, line 24, in Claim 1, after "and" delete "said" and insert -- a --, therefor.

Signed and Sealed this

Second Day of June, 2009

JOHN DOLL  
*Acting Director of the United States Patent and Trademark Office*